Dec. 28, 1965     W. N. MERRICK     3,226,164
AIR-FLO UNLOADER

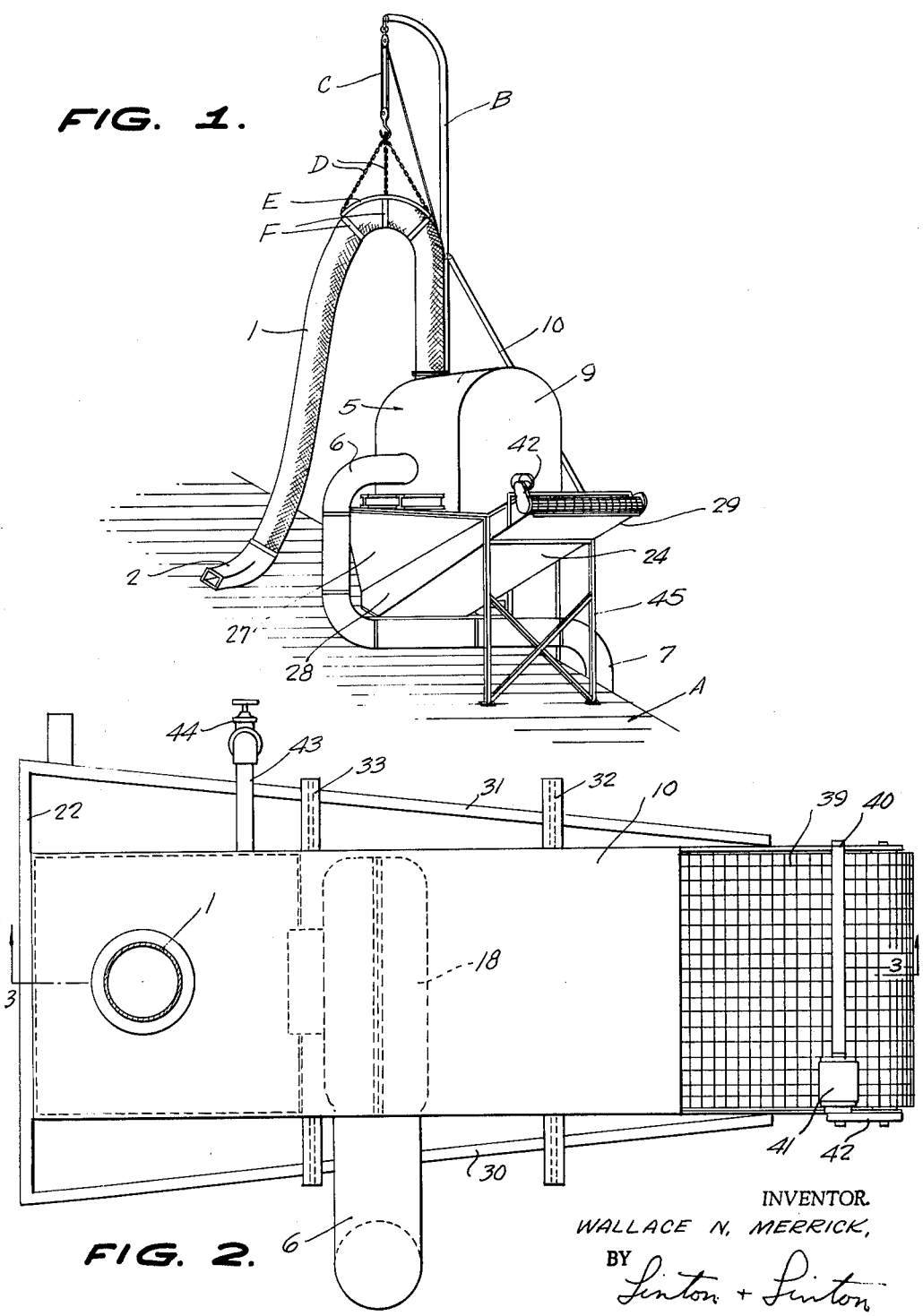

Filed March 12, 1964     2 Sheets-Sheet 2

INVENTOR.
WALLACE N. MERRICK,
BY
Linton + Linton
ATTORNEYS.

United States Patent Office 3,226,164
Patented Dec. 28, 1965

3,226,164
AIR-FLO UNLOADER
Wallace N. Merrick, 825 W. Jefferson St.,
Harlingen, Tex.
Filed Mar. 12, 1964, Ser. No. 351,289
4 Claims. (Cl. 302—14)

The present invention is concerned with an apparatus for transferring objects from one area to a second area.

The principal object of the present invention is to provide an apparatus for quickly and safely moving a plurality of objects from one area to a second area without damaging the same and, where desired, transferring the objects from an area at a different level to a second area.

A further and important object of the invention is to provide an apparatus that is flexible in use, capable of picking up objects over a wide area or in different areas without moving the bulk of the apparatus and which apparatus can be readily transported from one location to another as desired.

A still further important object of the invention is to provide an apparatus which transfers objects from different areas and also conveys the objects through the apparatus, washing the objects as they move therethrough.

Additional objects of the invention will be in part obvious and in part pointed out in the following detailed description of the accompanying drawings, in which:

FIG. 1 is a perspective view of the present apparatus mounted on a wharf;

FIG. 2 is an enlarged top plan view of the apparatus;

Figure 3:
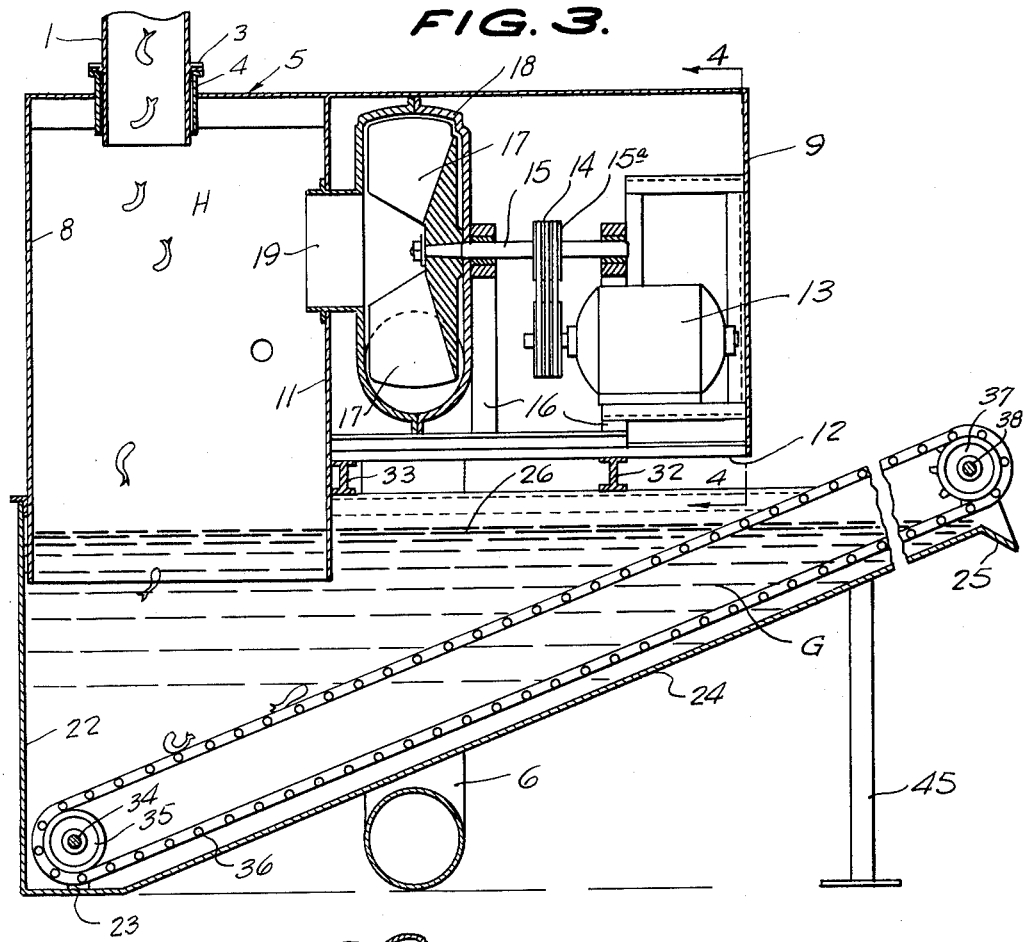
FIG. 3 is a longitudinal sectional view taken on line 3—3 of FIG. 2.

Referring now more particularly to the accompanying drawings in which like and corresponding parts are designated by similar reference characters, numeral 1 indicates a flexible air-proof hose having an open end nozzle 2 fixedly connected at one end thereof and a flange 3 at the other end seated upon the top of a tube 4 extending through and fixedly connected to the top of a housing generally indicated at 5. Said housing 5 has an air outlet pipe 6 fixedly connected thereto and extending therethrough and beneath the apparatus with a downwardly extending end portion 7.

Figure 4:
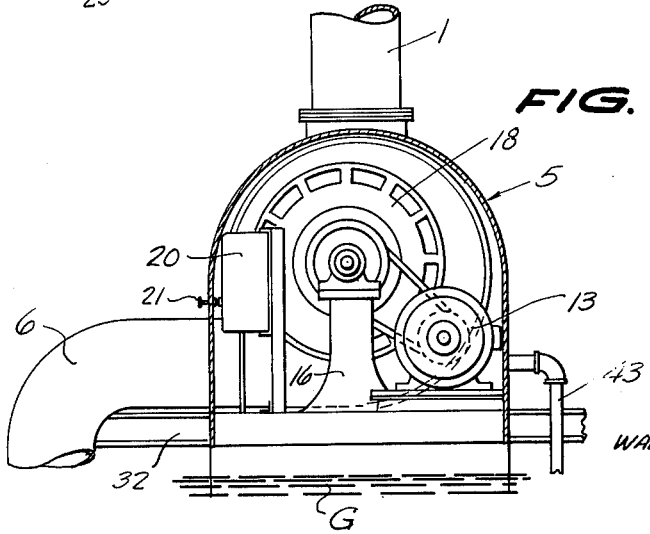
FIG. 4 is a cross-sectional view of reduced size, taken on line 4—4 of FIG. 3.

Said housing 5 has an inverted U-shaped cross-sectional configuration as shown in FIG. 4 with opposite end walls 8 and 9 with cover 10 fixedly joined thereto and providing the housing top and sides. An intermediate wall 11 extends across the interior of cover 10 parallel to said end walls. A bottom 12 extends from wall 9 to wall 11 across cover 10 closing off the housing between walls 9 and 11, but leaving an opening between walls 8 and 11 below said cover.

An electric motor 13 is mounted above bottom 12 and drives endless belts 14 extending around pulleys 15a fixedly mounted on shaft 15. Said shaft 15 is rotatably mounted on standards 16 and is fixedly connected to and rotatably supports vanes 17 positioned within annular housing 18. An inlet tube 19 extends through wall 11 and housing 18 axially of said housing. Pipe 6 is fixedly connected to and through the periphery of housing 18 for receiving air expelled from said housing.

An electrical control box 20 is connected to a source of electrical current (not shown) and motor 13 for controlling said motor and has a control handle 21 extending through cover 10.

An end wall 22 of a tank is joined to a flat bottom portion 23 from which extends the remainder of the bottom 24 on an upward slant. Bottom 24 has a bent lip 25 while a side 26 extends between end wall 22 and bottom 23–24 and is joined thereto. Similarly, a second side 27 extends between end wall 22 and bottom 23–24 and is also joined thereto providing a water tank. Side 26 slants inwardly from the top to an upright portion 29, while side 27 slants inwardly towards an upright portion 28 thereof.

A reinforcing bar 30 is fixedly mounted on the top edge of side 27 while a similar reinforcing bar 31 is fixedly mounted on the top edge of side 26. I-beams 32 and 33 extend across bars 30 and 31 with bottom 12 mounted thereon for being supported thereby.

A shaft 34 is rotatably mounted on bearings (not shown), fixedly connected and supported on side portions 28 and 29 and said shaft has sprockets 35 rotatably mounted thereon around which extends an end portion of a pair of chains 36 for driving and supporting an endless conveyor belt 39 which extends between side upright portions 28 and 29. The opposite end portion of said chains extends around sprockets 37 fixedly mounted on shaft 38. Shaft 38 is rotatably supported in bearings, not shown, supported by the upper end portions of upright portions 28 and 29 joined together by a connector bar 40. An electric motor 41 connected to control box 20 is mounted on bar 40 and drives an endless belt within cover 42, extending around shaft 38 for rotating the same moving belt 39 in a clockwise direction.

A water inlet pipe 43 is connected to a source of water under pressure, not shown, and to the side of cover 10 between walls 8 and 11 for supplying water therein and to the water tank therebeneath and has a control valve 44 interconnected therein.

An upright frame 45 is positioned beneath bottom 24 for supporting the same.

The present apparatus is capable of being produced in various sizes for use with various types and sizes of articles such as fruit, vegetables, fish, shrimp, as well as small manufactured articles and other natural products. The articles to be moved thereby are only limited by the size of nozzle 2 and the power of the suction created by vanes 17.

As an example only of the use of the present apparatus, shrimp is employed as the article to be transferred and the apparatus is shown in FIG. 1 as being mounted on a wharf A. A stanchion B fixedly mounted either on wharf A or end wall 22 has a block and pulley arrangement C hanging therefrom with chains D connected thereto and to a curved bar E from which extend bands F through which hose 1 extends so that the hose 1 can be raised or lowered and nozzle 2 positioned in various areas. For example, nozzle 2 can be placed in a pile of shrimp in the hold of a shrimp boat, not shown, alongside wharf A and control 21 operated to start motors 13 and 41 so that vanes 17 are rotated creating a suction in tube 19, between walls 8 and 11 and in hose 1 whereupon the shrimp H will be drawn into nozzle 2 and through hose 1 dropping between walls 8 and 11 as shown in FIG. 3 into the water G and settling on belt 39 whereupon it is moved with said belt and discharged at lip 25.

Water G forms an air seal at its level between walls 8 and 11 and cover 10 so that the air from hose 1 enters tube 19 into housing 18 and is then discharged through pipe 6–7. The weight of the shrimp after discharge from hose 1 causes them to drop to the water G and settle on belt 39 whereby they are washed as they pass through said water.

Water is supplied from pipe 43 under control valve 44 to keep the level of the water G in the water tank formed by elements 22 to 29 sufficiently high at all times to seal off the open bottom end of the chamber provided by walls 8 and 11 and cover 10.

The present invention is capable of considerable mod-

I claim:

1. An article conveyor comprising an open bottom housing, a wall extending across and within said housing, a bottom extending from one end of said housing to said wall leaving an opening in the bottom of said housing between the other end thereof and said wall, driven suction producing means mounted on said bottom and connected to and through said wall for drawing air therethrough, a flexible hose connected to said housing between said wall and the other end of said housing, an open top tank having said housing mounted thereon, means for supplying a liquid to said tank up to and closing off said housing bottom opening and a driven endless belt mounted in said tank and extending from beneath said housing bottom opening to and beyond said tank open top.

2. An article conveyor comprising an inverted U-shaped cover, a pair of end walls extending across said cover, an interior wall extending across said cover, a bottom extending from said interior wall to one of said end walls, driven suction producing means mounted on said bottom, a flexible hose connected to said cover between the other end wall and said intermediate wall, a tube extending through said intermediate wall connected to said suction producing means, an open top water tank having said bottom mounted on the top thereof with said other end wall, intermediate wall and cover extending into said tank, means for supplying a liquid to said tank above said cover, said intermediate wall and other end wall and a driven endless conveyor mounted in said tank below said cover and extending from said tank open top.

3. An article conveyor as claimed in claim 2 wherein said water tank has an end wall, a pair of side walls connected to and extending normal from said end wall and a bottom wall extending between and connected to said side walls, a portion connected to and extending normal from said end wall and the remainder of said bottom slanting upwardly.

4. An article conveyor as claimed in claim 2 wherein said tank has an upwardly slanting bottom and side walls with at least a portion thereof extending normal to said bottom and said conveyor belt extends across and between said side wall portions.

References Cited by the Examiner
UNITED STATES PATENTS

| | | | |
|---|---|---|---|
| 1,231,778 | 7/1917 | Nall | 302—23 |
| 2,366,763 | 1/1945 | Wieland | 302—15 |
| 2,666,671 | 1/1954 | Kimmerle | 302—14 |
| 2,744,792 | 5/1956 | Finn | 302—14 |
| 2,997,345 | 8/1961 | Stahle | 302—14 |
| 3,053,265 | 9/1962 | Erie | 302—14 |

SAMUEL F. COLEMAN, *Primary Examiner.*

ANDRES H. NIELSEN, *Examiner.*